(12) United States Patent
Srivastava et al.

(10) Patent No.: US 9,965,507 B2
(45) Date of Patent: May 8, 2018

(54) SECURING DATABASE CONTENT

(75) Inventors: Divesh Srivastava, Summit, NJ (US); Su Chen, Singapore (SG); Xin Dong, Morristown, NJ (US); Lakshmanan Sundaram Viravanallur, Vancouver (CA)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1302 days.

(21) Appl. No.: 12/852,017

(22) Filed: Aug. 6, 2010

(65) Prior Publication Data

US 2012/0036136 A1 Feb. 9, 2012

(51) Int. Cl.
*G06F 17/30* (2006.01)
*G06F 17/00* (2006.01)

(52) U.S. Cl.
CPC .. *G06F 17/30424* (2013.01); *G06F 17/30289* (2013.01); *G06F 17/30297* (2013.01); *G06F 17/30303* (2013.01)

(58) Field of Classification Search
CPC .. G06F 21/31; G06F 21/00; G06F 2221/2103; G06F 2221/2141
USPC .................................. 707/769, 783
See application file for complete search history.

(56) References Cited

U.S. PATENT DOCUMENTS

| | | | |
|---|---|---|---|
| 5,600,831 A | 2/1997 | Levy et al. |
| 5,603,025 A | 2/1997 | Tabb et al. |
| 5,655,116 A | 8/1997 | Kirk et al. |
| 5,897,632 A | 4/1999 | Dar et al. |
| 5,956,722 A | 9/1999 | Jacobson et al. |
| 5,970,489 A | 10/1999 | Jacobson et al. |
| 5,987,467 A | 11/1999 | Ross et al. |
| 5,999,192 A | 12/1999 | Selfridge et al. |
| 6,014,669 A | 1/2000 | Slaughter et al. |
| 6,026,390 A | 2/2000 | Ross et al. |
| 6,032,144 A | 2/2000 | Srivastava et al. |
| 6,047,272 A | 4/2000 | Biliris et al. |
| 6,061,676 A | 5/2000 | Srivastava et al. |
| 6,070,157 A | 5/2000 | Jacobson et al. |
| 6,073,130 A | 6/2000 | Jacobson et al. |
| 6,134,553 A | 10/2000 | Jacobson et al. |
| 6,167,397 A | 12/2000 | Jacobson et al. |
| 6,212,552 B1 | 4/2001 | Biliris et al. |
| 6,338,058 B1 | 1/2002 | Jacobson et al. |
| 6,363,379 B1 | 3/2002 | Jacobson et al. |
| 6,401,088 B1 | 6/2002 | Jagadish et al. |
| 6,411,966 B1 | 6/2002 | Kwan et al. |
| 6,434,573 B1 | 8/2002 | Jacobson et al. |
| 6,438,608 B2 | 8/2002 | Biliris et al. |
| 6,442,546 B1 | 8/2002 | Biliris et al. |
| 6,606,639 B2 | 8/2003 | Jacobson et al. |

(Continued)

*Primary Examiner* — Yicun Wu
(74) *Attorney, Agent, or Firm* — Scott P. Zimmerman, PLLC

(57) ABSTRACT

A method for securing content in a database includes identifying a challenge column associated with a database column referenced in an update query. A challenge value for the challenge column may be received and resolved for a match with a corresponding value stored in the challenge column. In case of a match, the update query may be certified for execution on the database, otherwise, the update query may be prevented from executing. Challenge columns may be determined by an analysis of the database on the basis of discriminating power, description complexity, and/or diversity.

19 Claims, 8 Drawing Sheets

(56) References Cited

U.S. PATENT DOCUMENTS

| | | |
|---|---|---|
| 6,678,826 B1 | 1/2004 | Kelly et al. |
| 6,904,433 B2 | 6/2005 | Kapitskaia et al. |
| 6,980,985 B1 | 12/2005 | Amer-Yahia et al. |
| 7,010,522 B1 | 3/2006 | Jagadish et al. |
| 7,032,000 B2 | 4/2006 | Tripp |
| 7,165,100 B2 | 1/2007 | Cranor et al. |
| 7,185,012 B1 | 2/2007 | Koudas et al. |
| 7,219,091 B1 | 5/2007 | Bruno et al. |
| 7,257,834 B1* | 8/2007 | Boydstun et al. ............ 726/1 |
| 7,356,528 B1 | 4/2008 | Amer-Yahia et al. |
| 7,415,461 B1 | 8/2008 | Guha et al. |
| 7,440,957 B1 | 10/2008 | Kotidis et al. |
| 7,444,326 B1 | 10/2008 | Jagadish et al. |
| 7,451,144 B1 | 11/2008 | Koudas et al. |
| 7,451,214 B1 | 11/2008 | Cranor et al. |
| 7,454,415 B1 | 11/2008 | Bruno et al. |
| 7,483,887 B1 | 1/2009 | Bruno et al. |
| 7,523,091 B2 | 4/2009 | Kapitskaia et al. |
| 7,590,657 B1 | 9/2009 | Cormode et al. |
| 7,623,534 B1 | 11/2009 | Ramakrishnan et al. |
| 7,630,967 B1 | 12/2009 | Srivastava et al. |
| 7,631,074 B1 | 12/2009 | Srivastava et al. |
| 7,657,503 B1 | 2/2010 | Cormode et al. |
| 7,664,749 B1 | 2/2010 | Koudas et al. |
| 7,664,806 B1 | 2/2010 | Koudas et al. |
| 7,668,801 B1 | 2/2010 | Koudas et al. |
| 7,797,342 B2 | 9/2010 | Banks et al. |
| 7,801,882 B2 | 9/2010 | Cunningham et al. |
| 7,831,711 B2 | 11/2010 | Cranor et al. |
| 7,849,091 B1 | 12/2010 | Cho et al. |
| 7,904,444 B1 | 3/2011 | Koudas et al. |
| 7,904,458 B2 | 3/2011 | Koudas et al. |
| 7,921,100 B2 | 4/2011 | Hadjieleftheriou et al. |
| 7,933,913 B2 | 4/2011 | Denuit et al. |
| 7,979,443 B2 | 7/2011 | Cho et al. |
| 8,001,146 B2 | 8/2011 | Koudas et al. |
| 2001/0009017 A1 | 7/2001 | Biliris et al. |
| 2002/0059380 A1 | 5/2002 | Biliris et al. |
| 2002/0087552 A1 | 7/2002 | Applewhite et al. |
| 2002/0138467 A1 | 9/2002 | Jacobson et al. |
| 2003/0055950 A1 | 3/2003 | Cranor et al. |
| 2003/0097355 A1 | 5/2003 | Kapitskaia et al. |
| 2003/0105745 A1 | 6/2003 | Davidson et al. |
| 2003/0126133 A1 | 7/2003 | Dattatri et al. |
| 2005/0027717 A1 | 2/2005 | Koudas et al. |
| 2005/0131946 A1 | 6/2005 | Korn et al. |
| 2005/0165866 A1 | 7/2005 | Bohannon et al. |
| 2005/0203897 A1 | 9/2005 | Kapitskaia et al. |
| 2006/0053122 A1 | 3/2006 | Korn et al. |
| 2006/0112090 A1 | 5/2006 | Amer-Yahia et al. |
| 2006/0224609 A1 | 10/2006 | Cormode et al. |
| 2007/0118547 A1 | 5/2007 | Gupta et al. |
| 2007/0198556 A1 | 8/2007 | Nist et al. |
| 2008/0052268 A1 | 2/2008 | Koudas et al. |
| 2008/0140619 A1 | 6/2008 | Srivastava et al. |
| 2008/0154891 A1 | 6/2008 | Amer-Yahia et al. |
| 2009/0019094 A1 | 1/2009 | Lashley et al. |
| 2009/0043775 A1* | 2/2009 | Cotner et al. ............ 707/9 |
| 2009/0052448 A1 | 2/2009 | Ramakrishnan et al. |
| 2009/0052449 A1 | 2/2009 | Ramakrishnan et al. |
| 2009/0063681 A1 | 3/2009 | Ramakrishnan et al. |
| 2009/0077044 A1 | 3/2009 | Krishnaswamy et al. |
| 2009/0106417 A1 | 4/2009 | Cranor et al. |
| 2009/0138469 A1 | 5/2009 | Koudas et al. |
| 2009/0138470 A1 | 5/2009 | Koudas et al. |
| 2009/0150339 A1 | 6/2009 | Bruno et al. |
| 2009/0171944 A1 | 7/2009 | Hadjieleftheriou et al. |
| 2009/0182767 A1 | 7/2009 | Meadway et al. |
| 2009/0193430 A1 | 7/2009 | Chao |
| 2009/0287721 A1 | 11/2009 | Golab et al. |
| 2009/0292726 A1 | 11/2009 | Cormode et al. |
| 2010/0023512 A1 | 1/2010 | Ramakrishnan et al. |
| 2010/0042581 A1 | 2/2010 | Srivastava et al. |
| 2010/0042606 A1 | 2/2010 | Srivastava et al. |
| 2010/0058405 A1 | 3/2010 | Ramakrishnan et al. |
| 2010/0088130 A1 | 4/2010 | Bonchi et al. |
| 2010/0100538 A1 | 4/2010 | Koudas et al. |
| 2010/0114776 A1* | 5/2010 | Weller et al. ............ 705/44 |
| 2010/0114840 A1 | 5/2010 | Srivastava et al. |
| 2010/0114920 A1 | 5/2010 | Srivastava et al. |
| 2010/0125559 A1 | 5/2010 | Hadjieleftheriou et al. |
| 2010/0132036 A1 | 5/2010 | Hadjieleftheriou et al. |
| 2010/0138443 A1 | 6/2010 | Ramakrishnan et al. |
| 2010/0153064 A1 | 6/2010 | Cormode et al. |
| 2010/0153379 A1 | 6/2010 | Cormode et al. |
| 2010/0199338 A1* | 8/2010 | Craddock ............ G06F 21/31 726/7 |
| 2010/0235317 A1 | 9/2010 | Yu et al. |
| 2010/0268719 A1 | 10/2010 | Cormode et al. |
| 2010/0274785 A1 | 10/2010 | Procopiuc et al. |
| 2010/0293129 A1 | 11/2010 | Dong et al. |
| 2010/0318519 A1 | 12/2010 | Hadjieleftheriou et al. |
| 2011/0041184 A1 | 2/2011 | Cormode et al. |
| 2011/0047185 A1 | 2/2011 | Cho et al. |
| 2011/0060818 A1 | 3/2011 | Cranor et al. |
| 2011/0066600 A1 | 3/2011 | Cormode et al. |
| 2011/0131170 A1 | 6/2011 | Golab et al. |

* cited by examiner

SECURING DATABASE CONTENT

BACKGROUND

1. Field of the Disclosure

The present disclosure relates to securing database content and, specifically, to securing database content during database access.

2. Description of the Related Art

Data residing in databases is typically verified for correctness and consistency. Various techniques such as schema normalization may be employed to verify data integrity and consistency. Despite such measures to ensure data integrity and consistency, incorrect data may still be introduced into a database.

DESCRIPTION OF THE EMBODIMENT(S)

Figure 1:
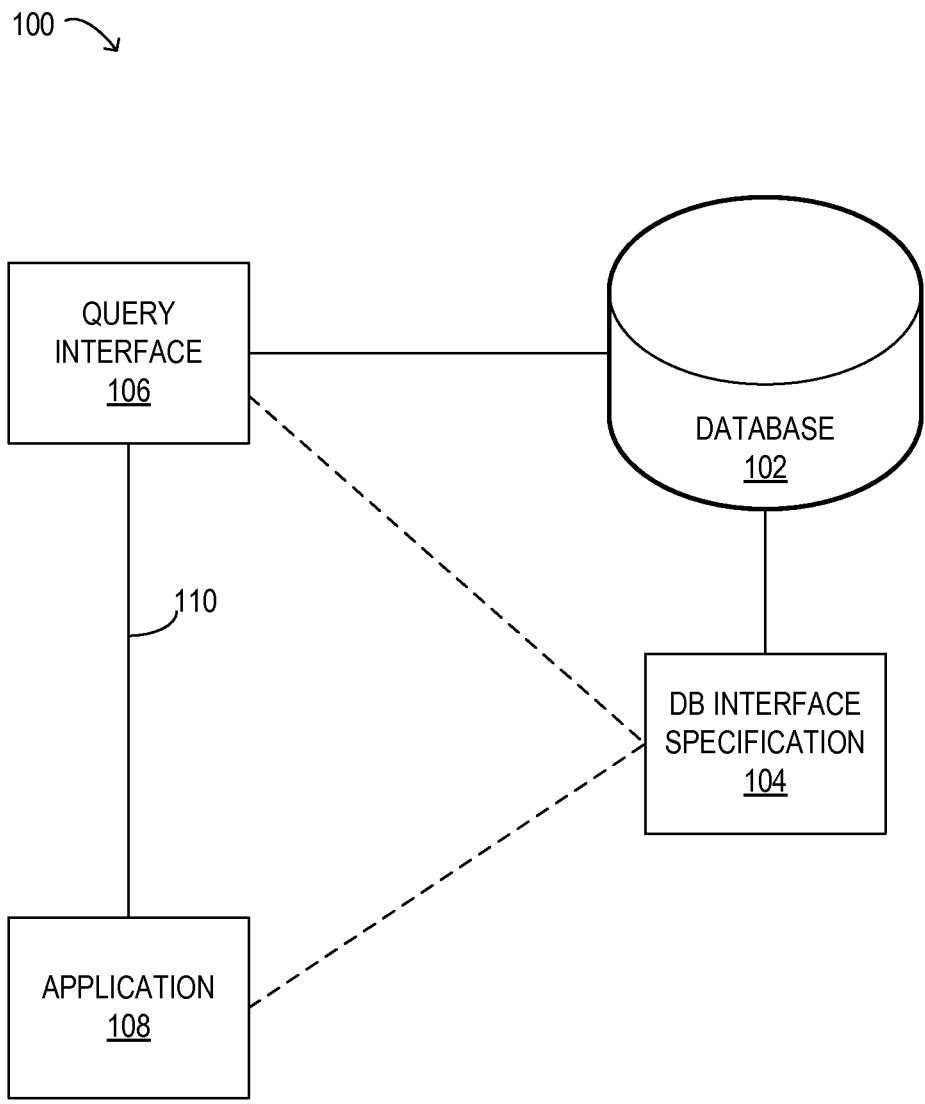
FIG. 1 is a block diagram of selected elements of a database system.

In one aspect, a disclosed method for accessing a database includes receiving an update query. The update query may specify an update column of a table included in the database. The update query may also specify a record in the table. The method may further include identifying a challenge column associated with the update column, and receiving a challenge value associated with the update query. The challenge value may be received from a database user after the update query is received. In other embodiments the challenge value may be provided contemporaneously with the update query, e.g., in a batch process. The challenge value may also be associated with the record. Responsive to the challenge value matching a corresponding value stored in the challenge column for the record, the method may also include allowing the update query to execute on the database.

In particular embodiments, the challenge column and the update column may both be included in the table. Identifying the challenge column may include identifying, based on a database interface specification, a challenge column list associated with the update column, and sending an indication of the challenge column list to a sender of the update query. The challenge column list may include at least two candidate challenge columns. Identifying the challenge column may further include receiving, from the sender of the update query, an indication of a selected challenge column included in the challenge column list, and designating the selected challenge column as the challenge column.

In certain embodiments, the update query and the challenge value may be received substantially simultaneously. The method may further include analyzing the database to determine potential challenge columns for the update column, and ranking the potential challenge columns according to a challenge criterion. The database may be a populated database. The challenge criterion may characterize the potential challenge columns using a discriminating power value, a description complexity value, a diversity value, or a combination thereof.

In another aspect, a disclosed computer system for implementing a database query interface, includes a processor configured to access memory media. The memory media may include processor executable instructions to receive an update query specifying an update column of a table included in a database coupled to the database query interface, and identify, based on a database interface specification, a challenge column associated with the update column. The update query may also specify a record in the table. The processor instructions may further be executable to receive a challenge value associated with the update query and further associated with the record, and, when the challenge value matches a corresponding value in the challenge column of the record, certify the update query for execution on the database.

In various embodiments, the memory media may further include processor instructions executable to prevent the update query from executing on the database when the challenge value does not match a corresponding value stored in the challenge column. The processor instructions may further be executable to analyze the database to determine potential challenge columns for the update column, generate rankings for the potential challenge columns according to a challenge criterion, and include the rankings in the database interface specification. The database may be a populated database. The challenge criterion may characterize the potential challenge columns using at least one of: a discriminating power value; a description complexity value; and a diversity value. The update column and the challenge column may both be included in the table.

In given embodiments, the memory media may further include processor instructions executable to identify, based on a database interface specification, a challenge column list associated with the update column, and send an indication of the challenge column list to a sender of the update query. The challenge column list may indicate at least two candidate challenge columns. The processor instructions may further be executable to receive, from the sender of the update query, an indication of a selected challenge column included in the challenge column list, designate the selected challenge column as the challenge column, and receive the challenge value. The processor instructions to identify the challenge column may further include processor instructions to determine that an identifier for the challenge column and the challenge value were included in the update query.

In yet another aspect, disclosed computer-readable memory media include processor instructions for accessing a database. The instructions may be executable to send a database update query specifying an update column of a table included in a database, determine, based on a database interface specification, a challenge column associated with the update column, and identify a challenge value corresponding to the challenge column. The update query may specify a record in the update column, while the challenge value may be associated with the record.

In some embodiments, the instructions to determine the challenge column may include instructions executable to receive, from the database, an indication of a challenge column list associated with the update column, and, in response to the first indication, send, to the database, an indication of a selected candidate challenge column included in the challenge column list. The challenge column list may specify at least two candidate challenge columns. The instructions to determine the challenge column may further include instructions executable to send the challenge value to the database. The challenge value may be sent substantially simultaneously with the update query in compliance with a query protocol given by the database interface specification. The update column and the challenge column may both be specified in the update query as elements in the table.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram of selected elements of a database system 100. Database system 100 is shown including a database 102, which generally represents a database storage system, such as a relational database management system (RDBMS). In various embodiments, database 102 includes data organized using data structures (not shown in FIG. 1) that may be linked to each other in meaningful relationships (see also FIG. 2). For example, database 102 may be organized using a number of different tables, such that each table defines a number of different data fields, referred to as columns in the table, and is populated with records of data (referred to as rows in the table). It is noted that database 102 may represent any of a variety of database types, including very large and complex databases or databases that include components that are physically placed in different locations, also referred to as distributed databases. As shown in FIG. 1, database 102 may be associated, or linked, with a DB interface specification 104. DB interface specification 104 may represent a collection of rules, conventions, documentation, and/or other forms of specifying (or describing) a particular logical database implemented using database 102. DB interface specification 104 may also include a description or specification detailing how database 102 may be accessed via an interface, such as query interface 106. It is noted that DB interface specification 104 may be provided along with database 102 when database system 100 is put in service. It is further noted that DB interface specification 104 may be modified to reflect corresponding changes in database 102 during the service life of database system 100.

A query interface 106 depicted in FIG. 1 represents an interface providing programmatic access for commands and data to and from database 102. In certain embodiments, query interface 106 may include functionality for interpreting query syntax and data and/or generating executable code recognized by database 102. For example, when database 102 is an RDBMS configured to use Structured Query Language (SQL), query interface 106 may be configured to receive SQL commands and related data and cause these commands to be executed by database 102. It is noted that query interface 106 may be configured to implement a database interface specified by DB interface specification 104. In certain instances, query interface 106 may communicate with DB interface specification 104 directly or via database 102 or by another means. The communication of query interface 106 with DB interface specification 104 may be in response to receiving a query for database 102 (i.e., in real-time during processing of database transactions). Using any of a variety of means, query interface 106 may implement or comply with a communications protocol specified by DB interface specification 104 for query access of database 102.

Also shown in FIG. 1 is an application 108 accessing database 102 via query interface 106 and communication link 110. Application 108 may represent any of various types of applications that are configured to access database 102. Application 108 may execute from a client computing device configured to access database 102 (see also FIG. 8). Application 108 may represent a number of instances of remote applications, while communication link 110 may represent corresponding network connections capable of communicating with query interface 106. Application 108 may rely upon DB interface specification 104 for instructions or conventions for communicating with query interface 106. It is noted that application 108 may be executed on a client computer (not shown in FIG. 1) while database 102 and/or query interface 106 may be executed on a server computer (also not shown in FIG. 1). In some embodiments, communication link 110 may employ a client-server paradigm.

In an operation of database system 100 illustrated in FIG. 1, application 108 may send update queries via query interface 106 for updating the contents of database 102. An update query may result in addition, modification, and/or deletion of data stored in a database. As will be described herein in further detail, DB interface specification 104 may specify at least one challenge column for each column in database 102. DB interface specification 104 may thus define a challenge column corresponding to a column that is specified in an update query. Query interface 106 may be configured to receive a challenge value corresponding to the challenge column, in order to certify the update query for execution on the database. Using challenge values to certify update queries, inadvertent and/or incorrect updates to a column specified in an update query may be substantially reduced or eliminated.

Figure 2:
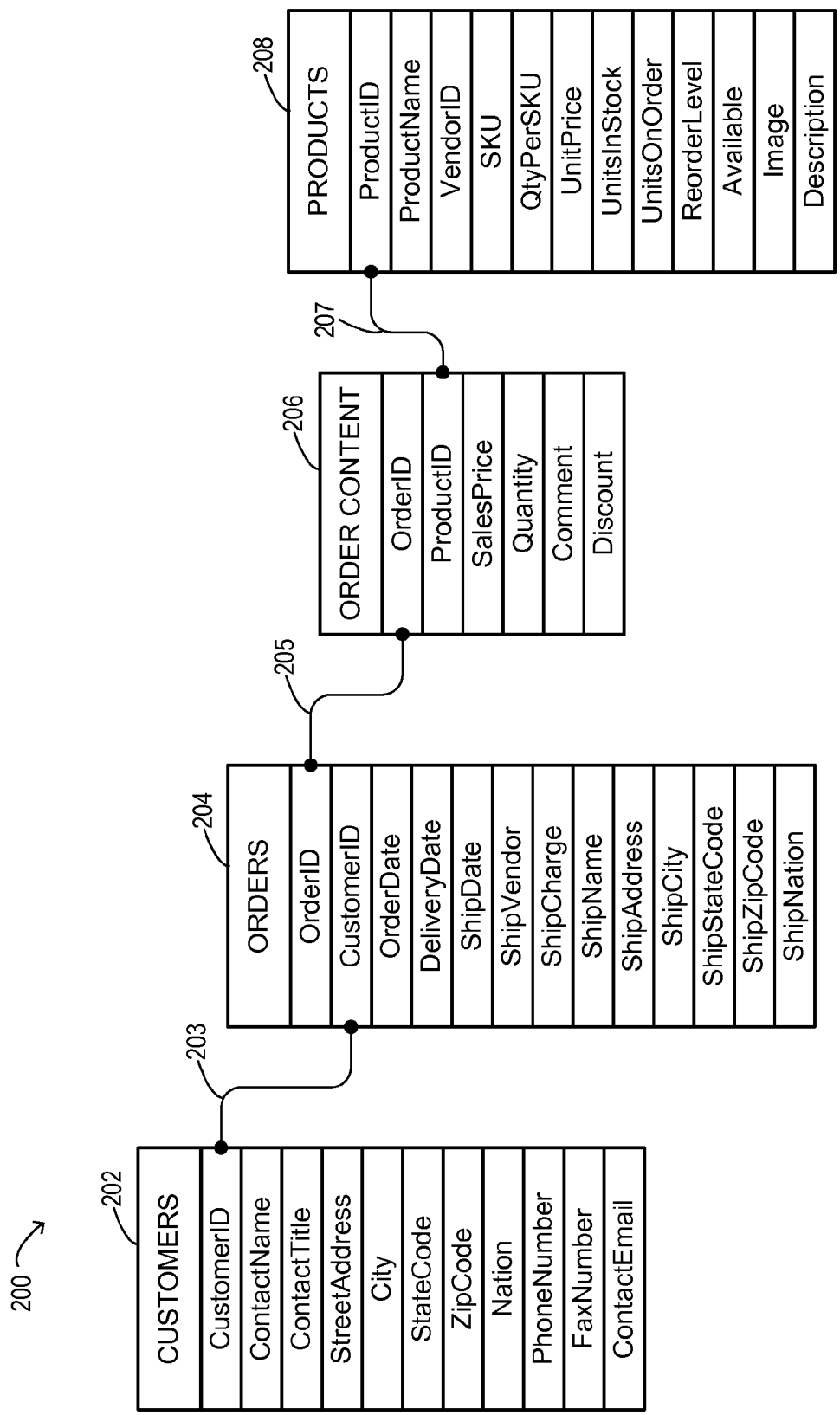
FIG. 2 is a block diagram of selected elements of an embodiment of a relational database.

Referring to FIG. 2, a block diagram of selected elements of an embodiment of a relational database 200 are shown. Relational database 200, as depicted in FIG. 2, may be exemplary of a vendor database and has been simplified for clarity. Relational database 200 is shown including four (4) tables 202, 204, 206, and 208, respectively labeled CUSTOMERS, ORDERS, ORDER CONTENT, and PRODUCTS. Each table as depicted in FIG. 2 indicates a number of different columns associated with the applicable table and representing data fields for populating the respective table. It is noted that in FIG. 2, no actual data records or tables are shown, but rather, a logical representation of the structure of relational database 200 is depicted. Table 202 (CUSTOMERS) represents a collection of customers of the vendor operating relational database 200. Table 204 (ORDERS) represents a list of orders by customers of the vendor. Table 206 (ORDER CONTENT) includes information describing specific products for each order. Table 208 (PRODUCTS) represents a list of products offered for sale by the vendor.

Also depicted in FIG. 2 are join relationships (i.e., "join paths," or simply, "joins") 203, 205, and 207 between individual tables. Specifically, join relationship 203 links a CustomerID column in table 202 (CUSTOMERS) with a CustomerID column in table 204 (ORDERS). In table 202

(CUSTOMERS), CustomerID may be a primary key column, that includes a unique value for each record in table 202 (CUSTOMERS). In table 204 (ORDERS), CustomerID may include any of the values (i.e., customers) in table 202 (CUSTOMERS) and represents a customer for a given order. An order in table 204 (ORDERS) may be uniquely identified by a primary key column OrderID in table 204 (ORDERS). Therefore, join relationship 203 may be referred to as a 1-to-m or one-to-many relationship, since an instance of a particular CustomerID appears only once in table 202 (CUSTOMERS), but may appear many times in table 204 (ORDERS). Join relationship 205 may link the OrderID column in table 204 (ORDERS) with a corresponding OrderID column in table 206 (ORDER CONTENT). Since each OrderID in table 204 (ORDERS) may be associated with one or more products, as given by a ProductID column, in table 206 (ORDER CONTENT), join relationship 205 is also a 1-to-m (one-to-many) relationship. Likewise, it will be understood that other join relationships may be an m-to-1 (many-to-one) relationship or may further be an m-to-n (many-to-many) relationship.

As the relatively simple example of relational database 200 shows, even a small number of tables, columns and relationships may create substantial complexity within the structure of a database. While an update query may be in compliance with the structure, it may, nonetheless, include incorrect data. For example, an update query to table 204 (ORDERS) may change the value of CustomerID to an allowable value, but may nonetheless cause an OrderID to be assigned to the wrong CustomerID. Many other possible errors may be similarly introduced with update queries.

In summary, tables in FIG. 2 are shown as collections of columns, representing different data fields of the table. A record in a table may have a data value for each column in the table. In addition, certain columns may be logically linked to other columns in different tables by join relationships. As will be described below using the example of relational database 200, each column may be associated with at least one challenge column (see also FIG. 3), whose value is provided to certify an update query. The challenge column(s) associated with each column may be recorded in DB interface specification 104 (see FIG. 1).

Figure 3:
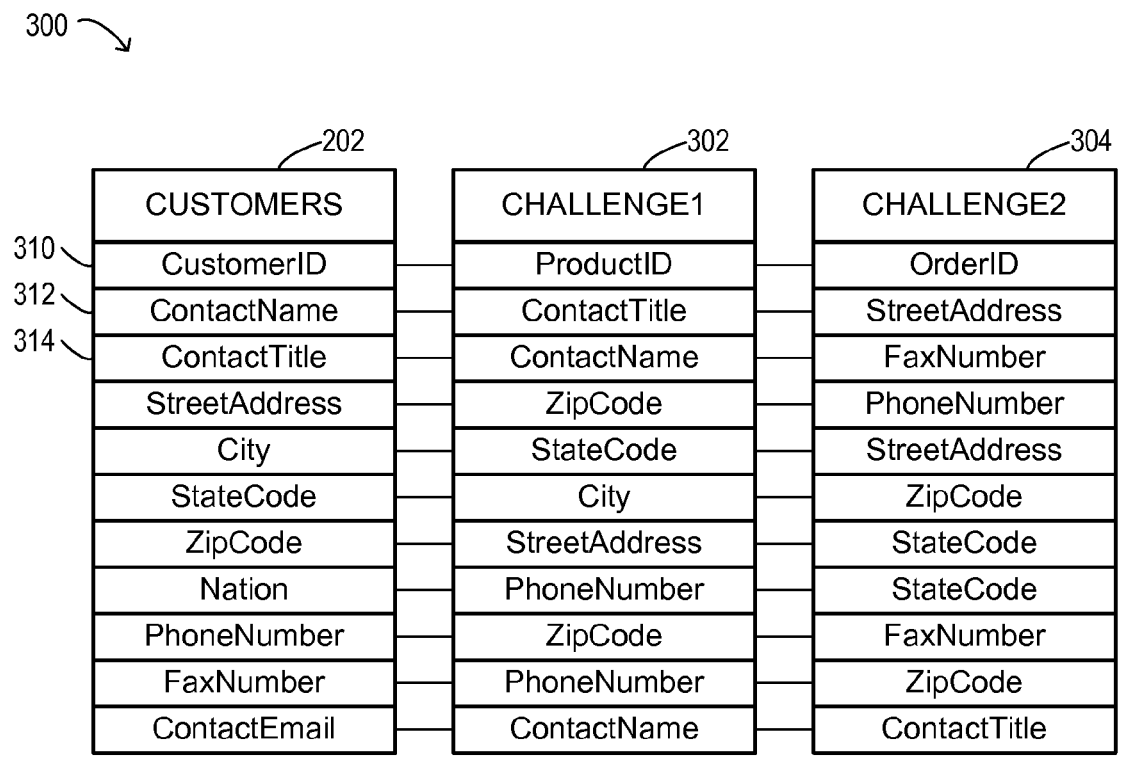
FIG. 3 is a block diagram of selected elements of an embodiment of a challenge column specification.

Turning now to FIG. 3, a block diagram of selected elements of an embodiment of a challenge column specification 300 are shown. In certain embodiments, challenge column specification 300 may be included in DB interface specification 104 (see FIG. 1) and may describe challenge columns for columns included in table 202 (CUSTOMERS) (see FIG. 2).

In FIG. 3, challenge column specification 300, based on table 202 (CUSTOMERS), is shown including a number of columns, including column 310 (CustomerID), column 312 (ContactName), and column 314 (ContactTitle), among other columns not specifically enumerated here for clarity, but which may be substantially similar to columns 310, 312, and 314. Challenge column specification 300 also includes challenge table 302 (CHALLENGE1) and challenge table 304 (CHALLENGE2). It is noted that challenge table 302 (CHALLENGE1) and challenge table 304 (CHALLENGE2) may be stored in a common database with table 202 (CUSTOMERS). However, in certain embodiments, challenge table 302 (CHALLENGE1) and challenge table 304 (CHALLENGE2) may be stored in a different location than table 202 (CUSTOMERS), for example, within DB interface specification 104 (see FIG. 1), or within another database (not shown in FIG. 3).

As shown in FIG. 3, each respective column in challenge table 302 (CHALLENGE1) and challenge table 304 (CHALLENGE2) is associated with a corresponding column in table 202 (CUSTOMERS). In challenge column specification 300, the columns in challenge table 302 (CHALLENGE1) and challenge table 304 (CHALLENGE2) are, themselves, other columns of table 202 (CUSTOMERS). In other embodiments, challenge columns associated with a given column may be columns from different tables than the table in which the given column is stored. Challenge table 302 (CHALLENGE1) and challenge table 304 (CHALLENGE2) may represent two options or choices for challenge columns (and their respective challenge values) associated with a given column. For example, when sending an update query to modify column 310 (CustomerID) in table 202 (CUSTOMERS), challenge table 302 (CHALLENGE1) specifies that a value for 'ProductID' is associated with column 310 (CustomerID), while challenge table 304 (CHALLENGE2) specifies that a value for 'OrderID' is also associated with column 310 (CustomerID). Thus, to certify the update query, a valid value for 'ProductID' and/or 'OrderID' associated with at least one record in the update query referencing column 310 (CustomerID) may be requested from a sender of the update query. In this manner, a likelihood that the update query references an incorrect record in table 202 (CUSTOMERS) may be substantially reduced or eliminated. It is noted that in certain instances, a valid value may be an empty value.

As illustrated in FIG. 3, column 312 (ContactName) may be associated with challenge column 'ContactTitle' in challenge table 302 (CHALLENGE1), and with challenge column 'StreetAddress' in challenge table 304 (CHALLENGE2). Similarly, column 314 (ContactTitle) may be associated with challenge column 'ContactName' in challenge table 302 (CHALLENGE1), and with challenge column 'FaxNumber' in challenge table 304 (CHALLENGE2). It is noted that an entity issuing the update query may be given a choice between a challenge column given by challenge table 302 (CHALLENGE1) or challenge table 304 (CHALLENGE2).

In various embodiments, challenge columns may be selected based on a relationship or logical commonality with a referenced column, or may be randomly chosen. In certain embodiments, an analysis of the database may be performed to determine challenge columns that are optimized based on certain criteria or characteristics. Such an analysis may improve the performance and the reliability of the methods described herein by selecting a challenge column satisfying (or optimizing) a desired challenge criterion. For example, potential challenge columns may be analyzed and ranked according to a challenge criterion. The challenge criterion may characterize the challenge column by a discriminating power value, a description complexity value, and a diversity value, as will be described in detail below. It is noted that the database analysis may depend on characteristics of data with which the database has been populated. The results of the database analysis may accordingly vary in different examples and implementations.

The "discriminating power," as used herein, is the probability that a challenge value in a challenge column is not a lucky guess. In other words, the discriminating power should result in challenge values that are not the same for unintended and intended updates. Therefore, a high (or sufficiently high) discriminating power may be a desirable feature for a challenge column. The "description complexity," as referred to herein, is a measure of the complexity of a challenge value, and may reflect, as examples, a number of data fields, a length of a data field, and/or a number of joins associated with a challenge column. If a challenge column has a description complexity that is too high, its use may be unwieldy and present a burden on the issuer of the update query. Thus a low description complexity may be a desirable feature for a challenge column. The "diversity," as used herein, is a measure of describing a correlated nature of different challenge columns, and may include, as examples, a comparison of join relationships and/or a relative complexity of join relationships. A high diversity of challenge columns provided to the issuer of the update query may enable a greater choice of challenge columns, and thereby enable issuers with more levels of familiarity or authorization with the challenge columns to provide challenge column values when issuing an update query. In this manner, a larger number of constituencies may be enabled to use the methods described herein for certifying update queries.

Figure 4:
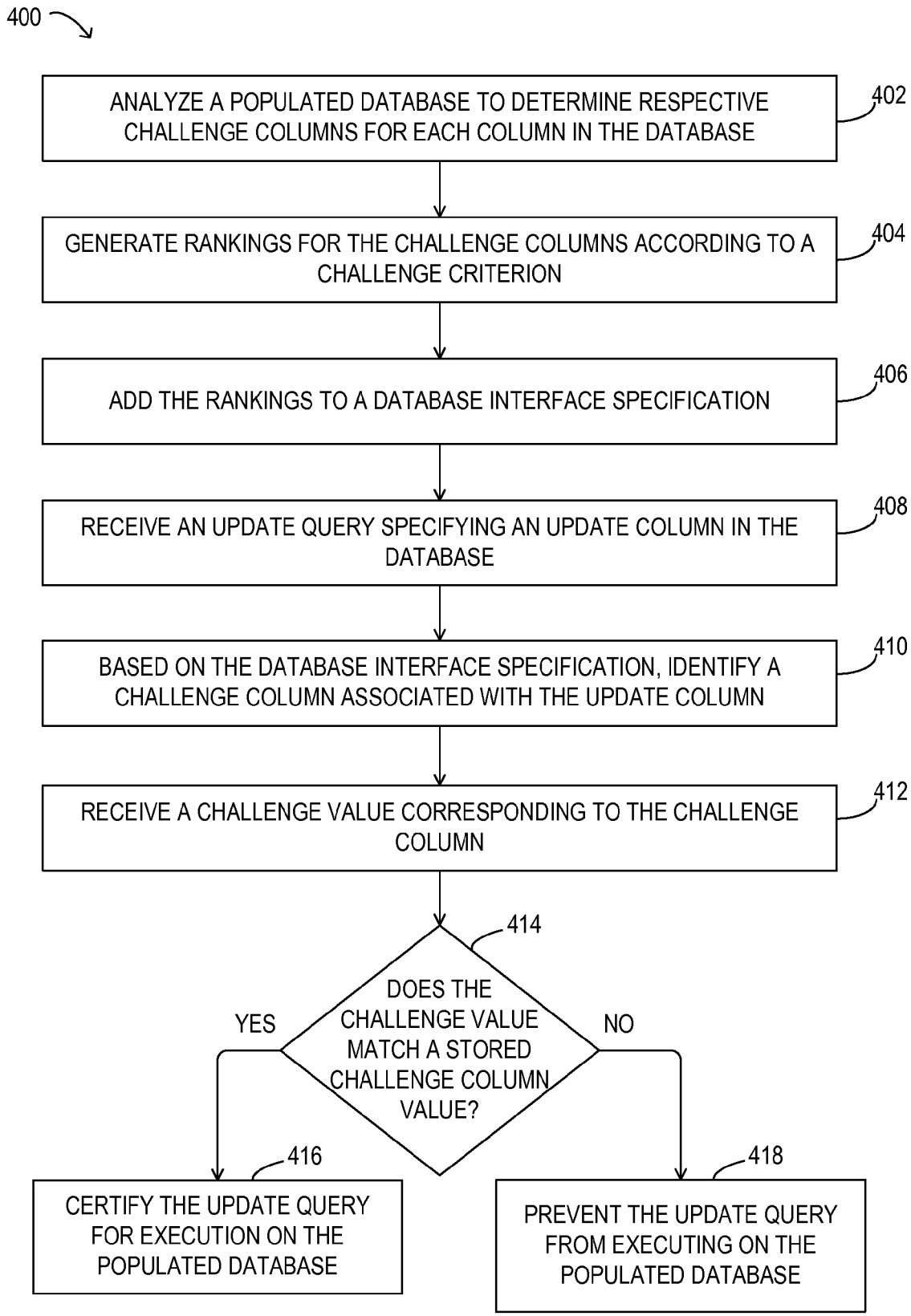
FIG. 4 is a block diagram of selected elements of an embodiment of a database access process.

Turning now to FIG. 4, selected elements of an embodiment of a method 400 for accessing a database are illustrated in flow chart form. Method 400 may represent a query protocol for accessing database 102 and may be specified by DB interface specification 104 (see FIGS. 1, 4). In one embodiment, method 400 may be performed by query interface 106 (see FIG. 1) in conjunction with DB interface specification 104 (see FIG. 1). Method 400 may also involve functionality provided by a query processing application 614 executing on computing device 600 (see FIG. 6). It is noted that certain operations described in method 400 may be optional or may be rearranged in different embodiments. It is further noted that while method 400 is described in terms of a first column (i.e., update column), it will be understood that multiple instances of method 400 may be executed, either concurrently or simultaneously or in a combination thereof, for a plurality of columns.

Method 400 may begin by analyzing a populated database to determine respective challenge columns for each column in the database (operation 402). Rankings for the potential challenge columns may be generated according to a challenge criterion (operation 404). The challenge criterion may be at least one of discriminating power, description complexity, and diversity. The rankings may be added to a database interface specification (operation 406). The rankings may be filtered and used to associate certain optimal challenge columns with the columns in the database. It is noted that operations 402-406 may be collectively performed as a configuration task on the populated database. An update query specifying a first column in the database may be received (operation 408). The update query may be received during operation of the populated database. In certain instances, the update query is received from an application accessing the populated database. Based on the database interface specification, a challenge column associated with the first column may be identified (operation 410). In one embodiment, a challenge column identifier may be located in the update query and/or another communication received from a sender of the update query. In certain embodiments, a protocol for allowing the sender of the update query to choose among possible challenge columns may be executed (see also FIG. 5). A challenge value associated with the challenge column may be received (operation 412). In some embodiments, the challenge value may be received substantially simultaneously with the update query or may be included in the update query.

Then, a decision may be made whether the challenge value matches a stored challenge column value (operation 414). The match may be based on one or more records in the first column that are referenced in the update query. That is, the stored challenge column value may be associated with a record in the challenge column corresponding to a record in the first column. If the result of operation 414 is YES, then the update query may be certified for execution on the populated database (operation 416). A certified update query may be considered safe for execution on a database. Certifying the update query may also include allowing, facilitating, and/or enabling the update query to execute on the database. If the result of operation 414 is NO, then the update query may be prevented from executing on the populated database (operation 418). An update query that is not certified may be considered unsafe for execution on a database. It is noted that operations 408-418 may be collectively performed as a certification task on the populated database.

Figure 5:
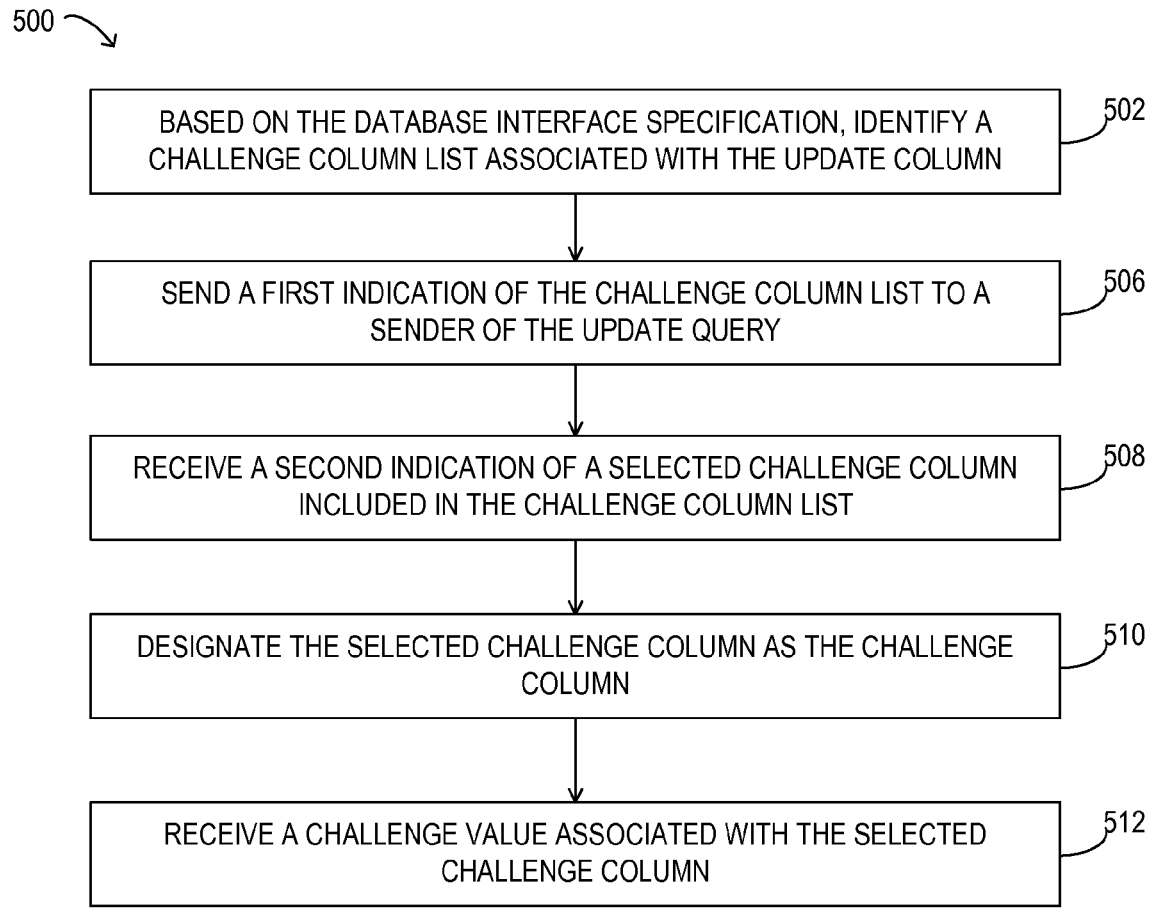
FIG. 5 is a block diagram of selected elements of an embodiment of a challenge column identification process.

Turning now to FIG. 5, a block diagram of selected elements of an embodiment of a challenge column identification process 500 is depicted. In certain embodiments, process 500 may represent an instance of operations 410 and 412 in FIG. 4. It is noted that certain operations described in process 500 may be optional or may be rearranged in different embodiments.

Based on the database interface specification, a challenge column list associated with the first column may be identified (operation 502). The challenge column list may represent two or more candidate challenge columns associated with the first column. A first indication of the challenge column list may be sent to a sender of the update query (operation 506). The first indication may be forwarded to the sender, for example, via a query interface. The first indication may include a request to select one candidate challenge column included in the challenge column list. Next, a second indication of a selected challenge column included in the challenge column list may be received (operation 508). The second indication may be received in response to sending the first indication. The second indication may represent a choice by the sender of the update query of the selected challenge column. The selected challenge column may be designated as the challenge column (operation 510). The challenge column may be associated with the first column. Then, a challenge value associated with the selected challenge column may be received (operation 512).

Figure 6:
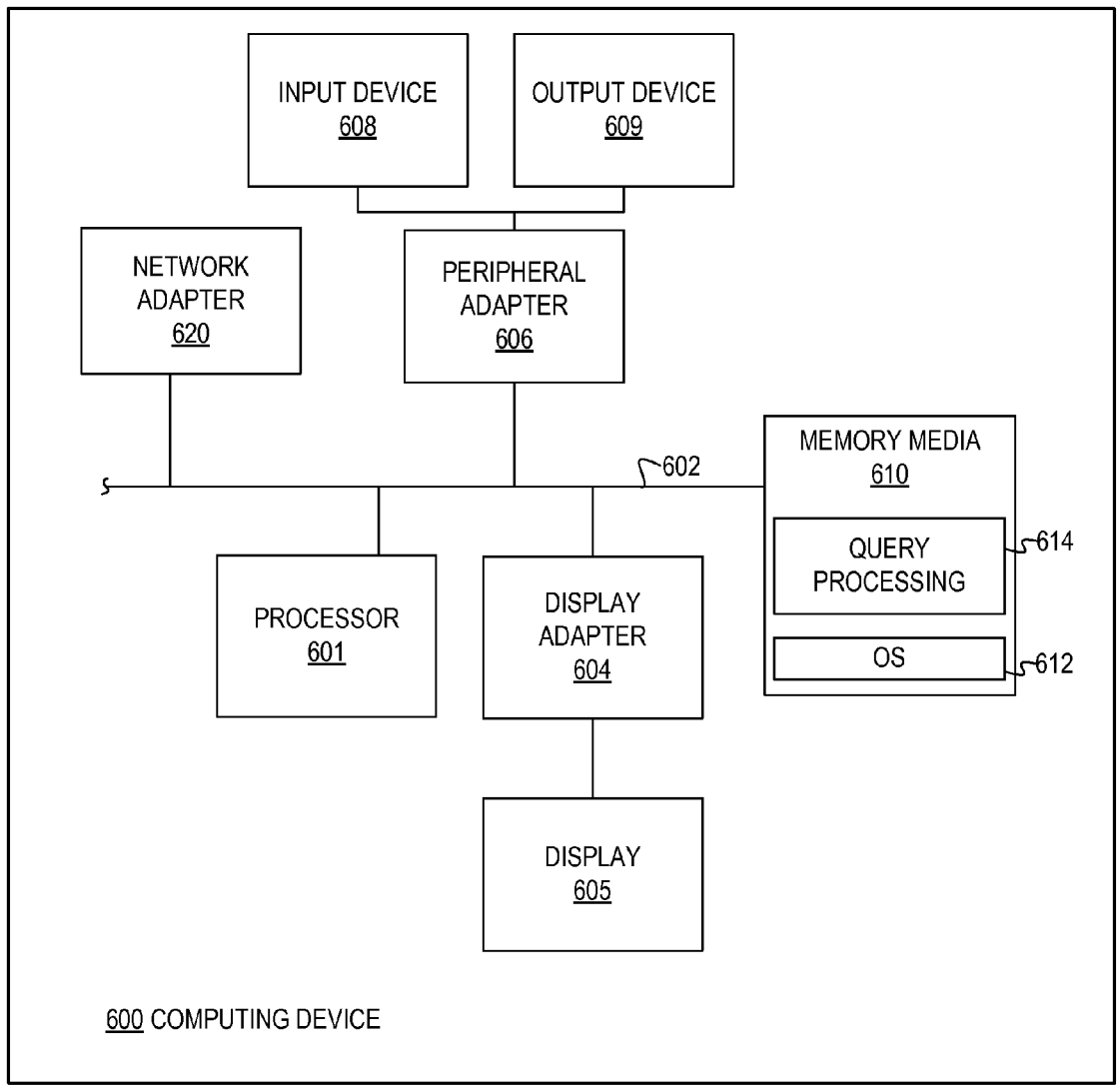
FIG. 6 is a block diagram of selected elements of an embodiment of a computing device.

Referring now to FIG. 6, a block diagram illustrating selected elements of an embodiment of a computing device 600 for performing query processing in conjunction with a database system is presented. In the embodiment depicted in FIG. 6, device 600 includes processor 601 coupled via bus 602 to storage media collectively identified as memory media 610.

Device 600, as depicted in FIG. 6, further includes network adapter 620 that interfaces device 600 to a network (not shown in FIG. 6). In embodiments suitable for use in database systems, device 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 6 including display adapter 604 and a display device or, more simply, a display 605. Display adapter 604 may interface bus 602, or another bus, with an output port for one or more displays, such as display 605. Display 605 may be implemented as a liquid crystal display screen, a computer monitor, a television or the like. Display 605 may comply with a display standard for the corresponding type of display. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 605 may include an output device 609, such as one or more integrated speakers to play audio content, or may include an input device 608, such as a microphone or video camera.

Memory media 610 may encompass persistent and volatile media, fixed and removable media, and magnetic and semiconductor media. Memory media 610 is operable to store instructions, data, or both. Memory media 610 as shown includes sets or sequences of instructions, namely, an operating system 612 and query processing 614. Operating system 612 may be a UNIX or UNIX-like operating system, a Windows® family operating system, or another suitable operating system.

In some embodiments, memory media 610 is configured to store and provide executable instructions for executing query processing 614, as mentioned previously. For example, query processing 614 may be configured to execute method 400 and/or process 500. In certain embodiments, computing device 600 may represent an implementation of query interface 106, database 102 (see FIG. 1), or a combination thereof. In various embodiments, network adapter 620 may be used to access database 102 and/or DB interface specification 104 (see FIG. 1).

Figure 7:
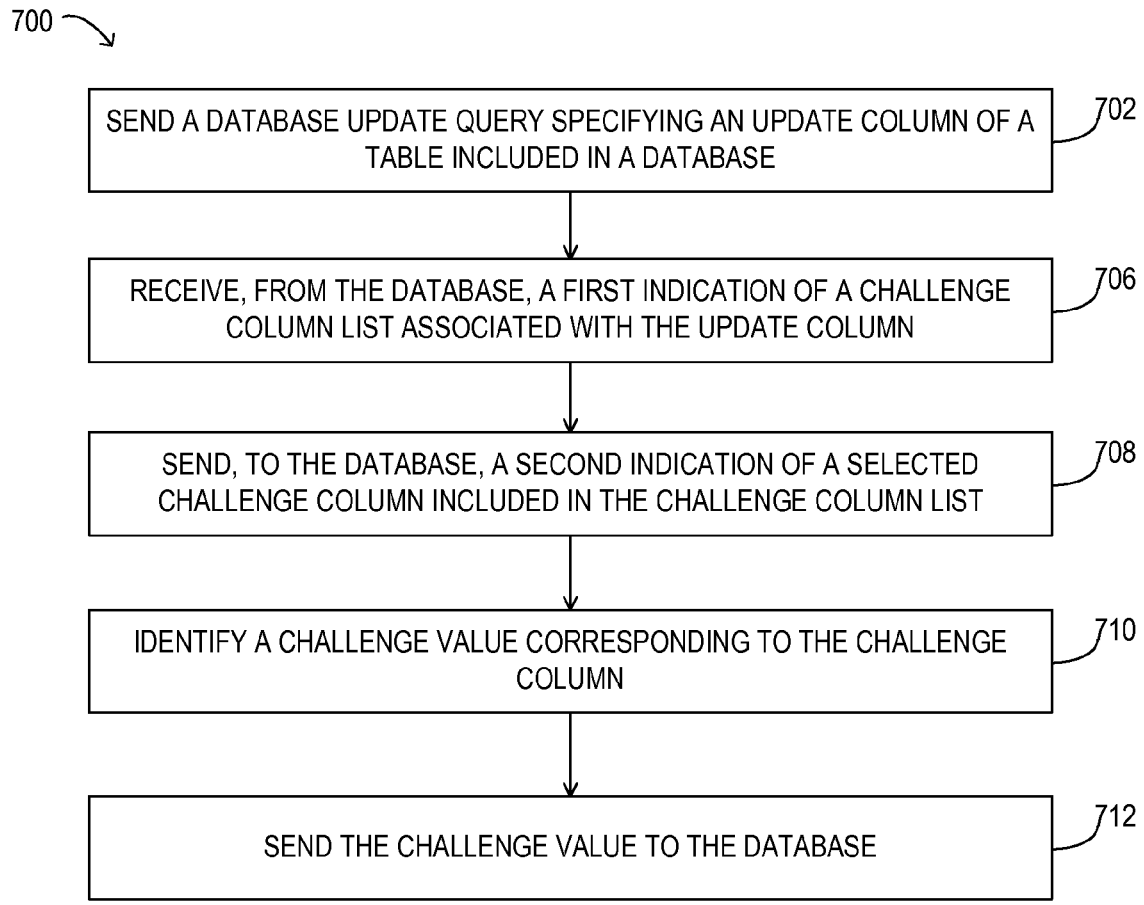
FIG. 7 is a block diagram of selected elements of an embodiment of a challenge column identification process.

Advancing now to FIG. 7, a block diagram of selected elements of an embodiment of a challenge column identification process 700 is depicted. In certain embodiments, process 700 may represent operations executed by application 108 and may execute from a client computing device configured to access database 102 (see FIGS. 1, 8). As such, method 700 may represent an example of a query protocol for updating database 102. In certain implementations, application 108 may communicate with query interface 106 via communication link 110 (see FIG. 1) during execution of process 700. It is noted that certain operations described in process 700 may be optional or may be rearranged in different embodiments.

In process 700, a database update query specifying a first column of a table included in a database may be sent (operation 702). A first indication of a challenge column list associated with the first column may be received from the database (operation 706). A second indication of a selected challenge column indicated by the challenge column list may be sent to the database (operation 708). A challenge value corresponding to the challenge column may be identified (operation 710). The challenge value may be sent to the database (operation 712).

Figure 8:
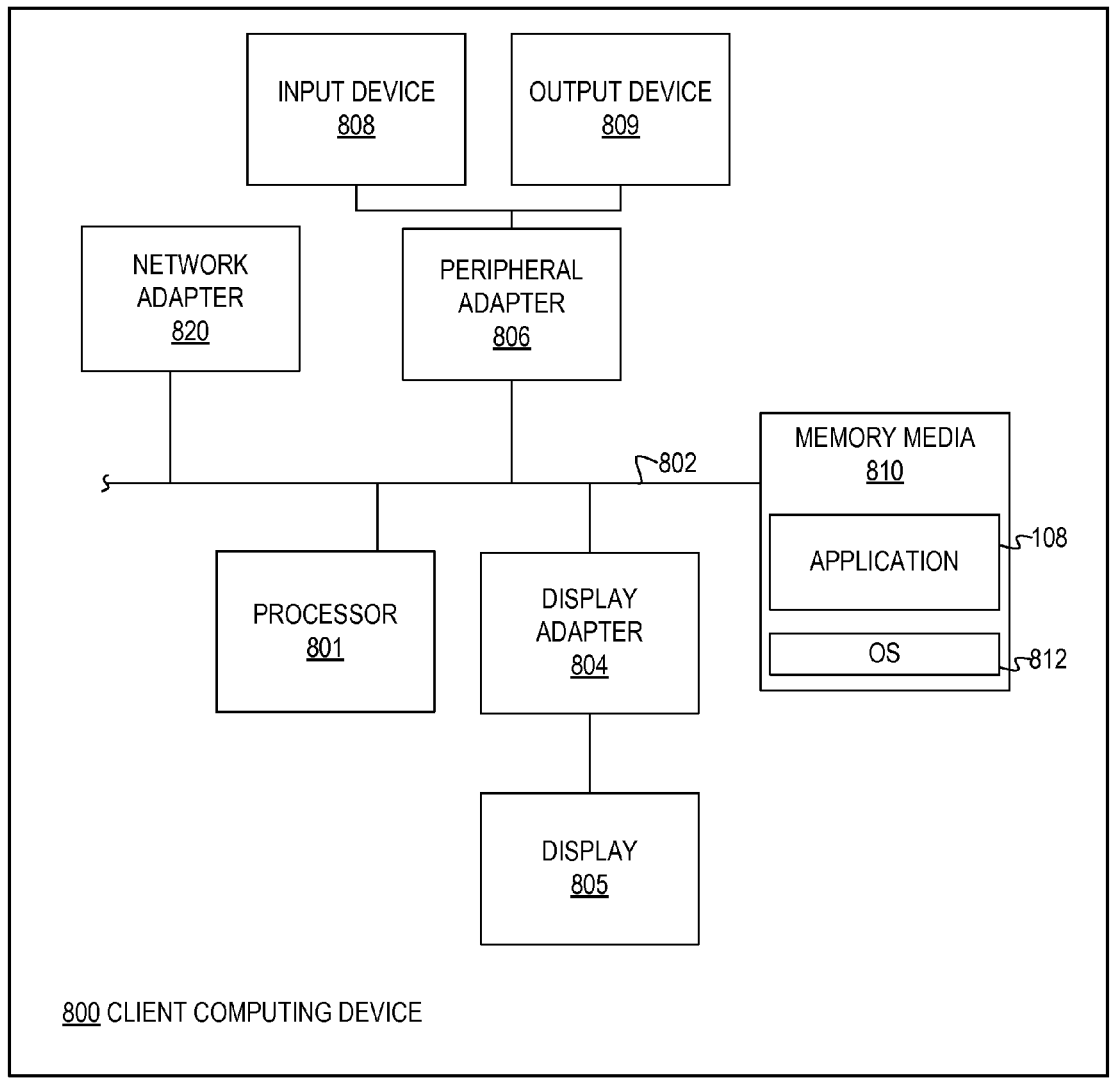
FIG. 8 is a block diagram of selected elements of an embodiment of a computing device.

Referring now to FIG. 8, a block diagram illustrating selected elements of an embodiment of a client computing device 800 for performing query processing in conjunction with a database system is presented. Client computing device 800 may represent a network client configured to access database 102 via communication link 110 (see FIG. 1). In the embodiment depicted in FIG. 8, device 800 includes processor 801 coupled via bus 802 to storage media collectively identified as memory media 810.

Device 800, as depicted in FIG. 8, further includes network adapter 820 that interfaces device 800 to a network (not shown in FIG. 8). In particular, network adapter 820 may provide connectivity for using communication link 110 (not shown in FIG. 8, see FIG. 1). In embodiments suitable for use in database systems, device 800, as depicted in FIG. 8, may include peripheral adapter 806, which provides connectivity for the use of input device 808 and output device 809. Input device 808 may represent a device for user input, such as a keyboard or a mouse, or even a video camera. Output device 809 may represent a device for providing signals or indications to a user, such as loudspeakers for generating audio signals.

Device 800 is shown in FIG. 8 including display adapter 804 and further includes a display device or, more simply, a display 805. Display adapter 804 may interface shared bus 802, or another bus, with an output port for one or more displays, such as display 805. Display 805 may be implemented as a liquid crystal display screen, a computer monitor, a television or the like. Display 805 may comply with a display standard for the corresponding type of display. Standards for computer monitors include analog standards such as VGA, XGA, etc., or digital standards such as DVI and HDMI, among others. A television display may comply with standards such as NTSC, PAL, or another suitable standard. Display 805 may include an output device 809, such as one or more integrated speakers to play audio content, or may include an input device 808, such as a microphone or video camera.

Memory media 810 encompasses persistent and volatile media, fixed and removable media, and magnetic and semiconductor media. Memory media 810 is operable to store instructions, data, or both. Memory media 810 as shown includes sets or sequences of instructions, namely, an operating system 812 and application 108 (see also FIG. 1). Operating system 812 may be a UNIX or UNIX-like operating system, a Windows® family operating system, or another suitable operating system.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for accessing a database, comprising:
receiving, by a server, an update query associated with the database, the update query sent from a client device requesting an update to the database, the update query specifying a column in the database and validation values for authenticating the update requested to the database;
querying, by the server, a database specification for the column specified by the update query, the database specification electronically associating challenge columns in challenge tables to columns in the database;
identifying, by the server, a first challenge column of the challenge columns in the database specification that is electronically associated to the column specified by the update query;
identifying, by the server, a second challenge column of the challenge columns in the database specification that is electronically associated to the column specified by the update query;
identifying, by the server, two challenge values from the challenge columns, a first challenge value of the two challenge values retrieved from the first challenge column in the database specification, and a second challenge value of the two challenge values retrieved from the second challenge column in the database specification;

comparing, by the server, the two challenge values identified from the challenge columns to the validation values specified by the update query;

determining, by the server, matches between the two challenge values identified from the challenge columns and the validation values specified by the update query; and validating, by the server, the update query for execution in response to the matches between the two challenge values and the validation values.

2. The method of claim 1, comprising receiving a selection sent from the client device, the selection selecting between one of the first challenge column and the second challenge column.

3. The method of claim 1, further comprising retrieving the two challenge values.

4. The method of claim 1, further comprising randomly selecting the first challenge value from the first challenge column.

5. The method of claim 1, further comprising randomly selecting the second challenge value from the second challenge column.

6. The method of claim 1, further comprising determining a characteristic of data referenced by the database.

7. The method of claim 6, further comprising ranking the challenge columns in the database specification according to the characteristic of the data.

8. A computer system, comprising:
a computer processor; and
a memory device, the memory device storing instructions, the instructions when executed cause the computer processor to perform operations, the operations comprising:
receiving an update query associated with a database, the update query sent from a client device requesting an update to the database, the update query specifying a column in the database and validation values for authenticating the update requested to the database;
querying a database specification for the column specified by the update query, the database specification electronically associating challenge columns in challenge tables to columns in the database;
identifying the challenge columns in the database specification that are electronically associated to the column specified by the update query;
randomly selecting a first challenge column of the challenge columns identified in the database specification that is electronically associated to the column specified by the update query;
randomly selecting a first challenge value from the first challenge column randomly selected from the challenge columns;
randomly selecting a second challenge column of the challenge columns identified in the database specification that is electronically associated to the column specified by the update query;
randomly selecting a second challenge value from the second challenge column randomly selected from the challenge columns;
comparing the first challenge value randomly selected from the first challenge column and the second challenge value randomly selected from the second challenge column to the validation values specified by the update query;
determining matches between the first challenge value and the second challenge value and the validation values specified by the update query; and validating the update query for execution in response to the matches.

9. The computer system of claim 8, wherein the operations further comprise preventing the update query responsive to a failure of any one of the matches.

10. The computer system of claim 8, wherein the operations further comprise retrieving the first challenge value from the first challenge column.

11. The computer system of claim 8, wherein the operations further comprise retrieving the second challenge value from the second challenge column.

12. The computer system of claim 8, wherein the operations further comprise determining a characteristic of data referenced by the database.

13. The computer system of claim 12, wherein the operations further comprise ranking the challenge columns according to the characteristic of the data.

14. A non-transitory computer readable medium storing instructions which, when executed by a computer processor, cause the computer processor to perform operations, the operations comprising:
receiving an update query associated with a database, the update query sent from a client device requesting an update to the database, the update query specifying a column of the database and validation values for authenticating the update requested by the client device;
querying a database specification for the column specified by the update query, the database specification electronically associating challenge columns in challenge tables to columns in the database;
identifying the challenge columns in the database specification that are electronically associated to the column specified by the update query;
randomly selecting a first challenge column of the challenge columns identified in the database specification that is electronically associated to the column specified by the update query;
randomly selecting a first challenge value from the first challenge column randomly selected from the challenge columns;
randomly selecting a second challenge column of the challenge columns identified in the database specification that is electronically associated to the column specified by the update query;
randomly selecting a second challenge value from the second challenge column randomly selected from the challenge columns;
comparing the first challenge value randomly selected from the first challenge column and the second challenge value randomly selected from the second challenge column to the validation values specified by the update query;
determining matches between the first challenge value and the second challenge value and the validation values; and
validating the update query for execution in response to the matches.

15. The non-transitory computer readable medium of claim 14, wherein the operations further comprise updating a record in the column.

16. The non-transitory computer readable medium of claim 15, wherein the operations further comprise retrieving at least one of the first challenge value randomly selected from the first challenge column and the second challenge value randomly selected from the second challenge column.

17. The non-transitory computer readable medium of claim 14, wherein the operations further comprise denying the execution of the update query responsive to a failure of any one of the matches.

18. The non-transitory computer readable medium of claim 14, wherein the operations further comprise determining a characteristic of data referenced by the database.

19. The non-transitory computer readable medium of claim 18, wherein the operations further comprise ranking the challenge columns according to the characteristic of the data.

\* \* \* \* \*